United States Patent
Zaidi

(10) Patent No.: US 10,562,740 B2
(45) Date of Patent: Feb. 18, 2020

(54) ELEVATOR LOAD BEARING TERMINATION ASSEMBLY FOR CARBON FIBER BELT

(71) Applicant: Otis Elevator Company, Farmington, CT (US)

(72) Inventor: Salman Zaidi, Manchester, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 156 days.

(21) Appl. No.: 15/705,642

(22) Filed: Sep. 15, 2017

(65) Prior Publication Data

US 2019/0084804 A1 Mar. 21, 2019

(51) Int. Cl.
*B66B 7/08* (2006.01)
*B66B 9/00* (2006.01)
*F16G 11/04* (2006.01)

(52) U.S. Cl.
CPC .............. *B66B 7/085* (2013.01); *B66B 9/00* (2013.01); *F16G 11/04* (2013.01)

(58) Field of Classification Search
CPC ........... B66B 7/085; B66B 9/00; B66B 7/062; F16G 11/04
See application file for complete search history.

(56) References Cited

U.S. PATENT DOCUMENTS

| | | | | |
|---|---|---|---|---|
| 3,374,511 A | * | 3/1968 | Barker | F16G 11/04 403/369 |
| 4,635,989 A | * | 1/1987 | Tremblay | F16G 11/04 254/134.3 FT |
| 4,845,814 A | * | 7/1989 | Crook | F16G 11/048 24/136 R |
| 9,086,117 B2 | * | 7/2015 | Van der Ende | E21B 19/12 |
| 9,422,134 B2 | * | 8/2016 | Ikonen | B66B 5/0031 |
| 9,534,660 B2 | * | 1/2017 | Ferreira | F16G 11/10 |
| 2002/0154945 A1 | * | 10/2002 | Ericson | B66B 7/085 403/374.1 |
| 2003/0041419 A1 | * | 3/2003 | Perez | B66B 7/085 24/136 R |

(Continued)

FOREIGN PATENT DOCUMENTS

| CN | 1234362 A | 11/1999 |
|---|---|---|
| CN | 1589231 A | 3/2005 |

(Continued)

OTHER PUBLICATIONS

European Search Report Issued in EP Application No. 18194610.4, dated Feb. 20, 2019, 9 Pages.

(Continued)

*Primary Examiner* — Michael A Riegelman
(74) *Attorney, Agent, or Firm* — Cantor Colburn LLP

(57) ABSTRACT

A termination device for a suspension member of an elevator system includes a termination housing, and two wedge assemblies located in the termination housing. The wedge assemblies are interactive with a suspension member end positioned between the two wedge assemblies to apply a clamping force to the suspension member end in response to an axial load acting on the suspension member end. Each wedge assembly includes a wedge and a biasing element operably connected to the wedge to bias a position of the wedge along a suspension member axis direction.

16 Claims, 4 Drawing Sheets

(56) References Cited

U.S. PATENT DOCUMENTS

| | | | |
|---|---|---|---|
| 2004/0129506 A1* | 7/2004 | Ericson | B66B 7/085 187/411 |
| 2009/0307876 A1* | 12/2009 | Pitts | B66B 7/085 24/136 R |
| 2011/0108502 A1* | 5/2011 | Bell | B66C 1/36 212/276 |
| 2013/0160245 A1* | 6/2013 | Ferreira | F16G 11/10 24/135 A |
| 2015/0101889 A1* | 4/2015 | Kere | B66B 7/085 187/254 |
| 2016/0185572 A1* | 6/2016 | Lehtinen | F16G 11/044 187/411 |
| 2016/0207739 A1* | 7/2016 | Pelto-Huikko | B66B 7/085 |
| 2016/0272466 A1* | 9/2016 | Helenius | B66B 5/0031 |
| 2016/0355378 A1* | 12/2016 | Lehtinen | B66B 7/085 |
| 2017/0036891 A1* | 2/2017 | Lehtinen | B66B 7/085 |
| 2017/0121149 A1* | 5/2017 | Lehtinen | F16G 11/025 |
| 2017/0189952 A1* | 7/2017 | Lampinen | B21C 23/00 |
| 2017/0217730 A1* | 8/2017 | Helenius | B66B 7/085 |
| 2018/0111795 A1* | 4/2018 | Dudde | B66B 7/085 |
| 2018/0155156 A1* | 6/2018 | Kuczek | B66B 9/00 |
| 2018/0208436 A1* | 7/2018 | Schmidt | B66B 7/085 |
| 2019/0084804 A1* | 3/2019 | Zaidi | B66B 9/00 |

FOREIGN PATENT DOCUMENTS

| | | |
|---|---|---|
| CN | 102056830 A | 5/2011 |
| CN | 102992147 A | 3/2013 |
| CN | 202988472 U | 6/2013 |
| CN | 107021399 A | 8/2017 |
| DE | 2457298 A1 | 6/1976 |
| DE | 202017102097 U1 | 5/2017 |
| EP | 3103754 A1 | 12/2016 |
| EP | 3176117 A1 | 6/2017 |
| EP | 3199482 A1 | 8/2017 |
| GB | 191004609 A | 2/1911 |
| GB | 882398 A | 11/1961 |
| TW | 200951323 A | 12/2009 |
| WO | 2009109060 A1 | 9/2009 |
| WO | 2009150866 A1 | 12/2009 |
| WO | 2015121940 A1 | 8/2015 |

OTHER PUBLICATIONS

Chinese Office Action Issued in CN Application No. 201811074953.7, dated Nov. 29, 2019, 11 Pages.

* cited by examiner

ELEVATOR LOAD BEARING TERMINATION ASSEMBLY FOR CARBON FIBER BELT

BACKGROUND

The subject matter disclosed herein relates to elevator systems. More particularly, the present disclosure relates to termination of suspension members of elevator systems.

A typical elevator system includes an elevator car, suspended by one or more suspension members, typically a rope or belt, that moves along a hoistway. The suspension member includes one or more tension members and is routed over one or more sheaves, with one sheave, also known as a drive sheave, operably connected to a machine. The machine drives movement of the elevator car via interaction of the drive sheave with the suspension member. The elevator system further typically includes a counterweight interactive with the suspension member. One or more of the ends of the suspension member are terminated, or retained in the hoistway.

Elevator rope or belt terminations typically rely on the ability to either wrap the rope or belt around a wedge, or the ability to spread the individual wires of the rope and create a knob by placing the spread wires into a socket and potting with a material such as a babbitt or epoxy-based potting compound. These typical methods do not work for suspension members that utilize tension members formed from or including unidirectional fibers in a rigid matrix. In such an arrangement, the tension member will fracture if bent around a typical wedge radius, and the fibers are not able to be spread and bent to be utilized in the potted arrangement. Methods of terminating the suspension member which do not require such deformation occupy significant amounts of space and require a relatively high clamping force to retain the suspension member. Such methods are prone to under-tightening, resulting in slippage of the suspension member.

BRIEF SUMMARY

In one embodiment, a termination device for a suspension member of an elevator system includes a termination housing, and two wedge assemblies located in the termination housing. The wedge assemblies are interactive with a suspension member end positioned between the two wedge assemblies to apply a clamping force to the suspension member end in response to an axial load acting on the suspension member end. Each wedge assembly includes a wedge and a biasing element operably connected to the wedge to bias a position of the wedge along a suspension member axis direction.

Additionally or alternatively, in this or other embodiments the termination housing includes a housing inner surface tapering inwardly toward the suspension member with increasing distance from the suspension member end.

Additionally or alternatively, in this or other embodiments the wedge includes a wedge outer surface abutting the housing inner surface and having a taper complimentary to the housing inner surface and a wedge inner surface configured to abut the suspension member end.

Additionally or alternatively, in this or other embodiments the termination housing includes two opposing face plates, and two opposing side plates affixed to the face plates, each side plate defining the housing inner surface.

Additionally or alternatively, in this or other embodiments one or more plate tabs are located in each side plate and one or more plate openings are located in each face plate. The one or more plate tabs are insertable into the one or more plate openings to form the termination housing.

Additionally or alternatively, in this or other embodiments the two face plates are secured to the two side plates via welding.

Additionally or alternatively, in this or other embodiments the biasing element is a spring operably connected to the wedge and to the termination housing.

Additionally or alternatively, in this or other embodiments the spring extends between a retaining rod installed in the termination housing and the wedge.

Additionally or alternatively, in this or other embodiments the retaining rod extends through a face plate of the termination housing.

In another embodiment, an elevator system includes a hoistway, an elevator car located in the hoistway and a suspension member operably connected to the elevator car to suspend and/or drive the elevator car along the hoistway. A termination device is located in the hoistway and is operably connected to a suspension member end of the suspension member. The termination device includes a termination housing, and two wedge assemblies located in the termination housing. The wedge assemblies are interactive with a suspension member end located between the two wedge assemblies to apply a clamping force to the suspension member in response to an axial load acting on the suspension member end. Rach wedge assembly includes a wedge, and a biasing element operably connected to the wedge to bias a position of the wedge along a suspension member axis direction.

Additionally or alternatively, in this or other embodiments the termination housing includes a housing inner surface tapering inwardly toward the suspension member with increasing distance from the suspension member end.

Additionally or alternatively, in this or other embodiments the wedge includes a wedge outer surface abutting the housing inner surface and having a taper complimentary to the housing inner surface, and a wedge inner surface configured to abut the suspension member end.

Additionally or alternatively, in this or other embodiments the termination housing includes two opposing face plates, and two opposing side plates affixed to the face plates, each side plate defining the housing inner surface.

Additionally or alternatively, in this or other embodiments one or more plate tabs are positioned in each side plate, and one or more plate openings are positioned in each face plate. The one or more plate tabs are insertable into the one or more plate openings to form the termination housing.

Additionally or alternatively, in this or other embodiments the two face plates are secured to the two side plates via welding.

Additionally or alternatively, in this or other embodiments the biasing element is a spring operably connected to the wedge and to the housing.

Additionally or alternatively, in this or other embodiments the spring extends between a retaining rod installed in the housing and the wedge.

Additionally or alternatively, in this or other embodiments the retaining rod extends through a face plate of the housing.

Additionally or alternatively, in this or other embodiments the suspension member includes a plurality of tension elements extending along a length of the suspension member, each tension element including a plurality of fibers extending along the length of the suspension member bonded into a polymer matrix. A jacket substantially retains the plurality of tension members.

Additionally or alternatively, in this or other embodiments the plurality of fibers are formed from one or more of carbon, glass, polyester, nylon, or aramid material.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
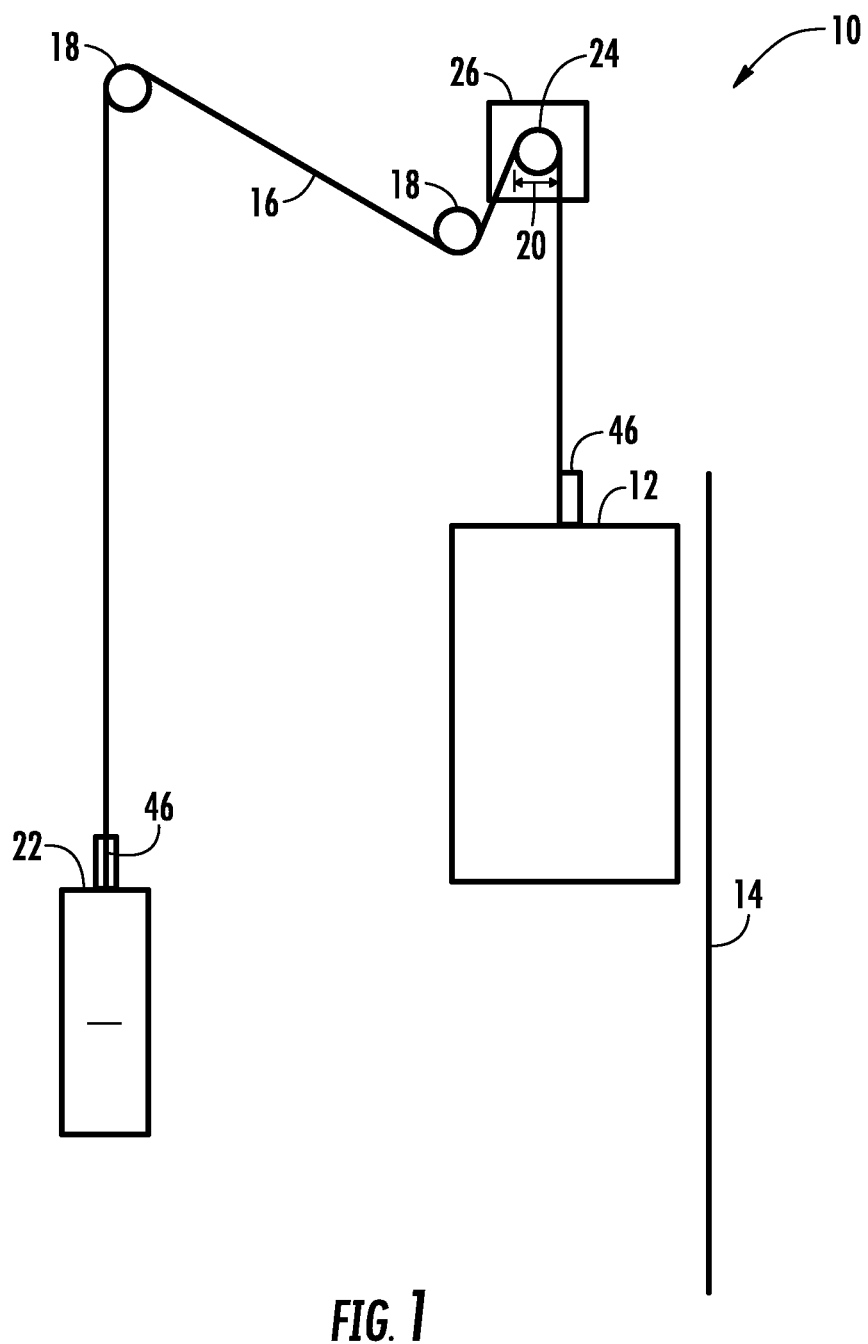
FIG. 1 is a schematic view of an exemplary elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 24. The traction sheave 24 is driven by a machine 26. Movement of drive sheave by the machine 26 drives, moves and/or propels (through traction) the one or more belts 16 that are routed around the traction sheave 24. At least one of the sheaves 18 could be a diverter, deflector or idler sheave. Diverter, deflector or idler sheaves are not driven by a machine 26, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 or only one side of the one or more belts 16 engages the one or more sheaves 18. The embodiment of FIG. 1 shows a 1:1 roping arrangement in which the one or more belts 16 terminate at the car 12 and counterweight 22, while other embodiments may utilize other roping arrangements.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
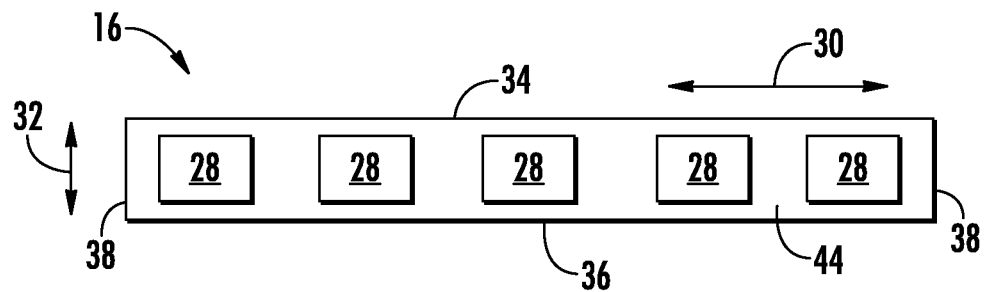
FIG. 2 is a cross-sectional view of an embodiment of a belt for an elevator system.

FIG. 2 provides a cross-sectional schematic of an exemplary belt 16 construction or design. The belt 16 includes a plurality of tension elements 28 extending longitudinally along the belt 16. While the tension elements 28 in the embodiment of FIG. 2 are rectangular in cross-section, it is to be appreciated that other cross-sectional shapes, such as circular, may be utilized in other embodiments. The tension elements 28 may be at least partially encased in a jacket 44, in some embodiments formed from a polymer material such as a thermoplastic polyurethane (TPU). The belt 16 has a belt width 30 and a belt thickness 32, with an aspect ratio of belt width 30 to belt thickness 32 greater than one. The belt 16 defines a traction side 34, which is interactive with the traction sheave 24 and a back side 36 opposite the traction side 34. The belt 16 further defines belt edges 38 extending between the traction side 34 and the back side 36.

Figure 3:
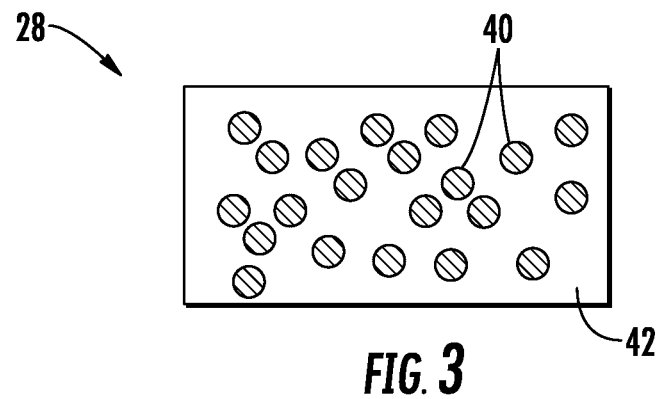
FIG. 3 illustrates an embodiment of a tension element for a belt of an elevator system.

Referring now to FIG. 3, the tension elements 28 include a plurality of fibers 40 bonded to a polymer matrix 42 to form the tension elements 28. The fibers 40 are continuous or discontinuous or combination of continuous and discontinuous over the belt 16 length and, oriented generally such that a fiber 40 length is directed along the belt 16 length. The fibers 40 may be formed of one or more of a number of materials, such as carbon, glass, polyester, nylon, aramid or other polyimide materials. Further, the fibers 40 may be organized into a grouping, such as a spun yarn. The matrix 42 may be formed of, for example a thermoset or thermoplastic material. The tension element 28 is further configured to have a fiber 40 density of 30% to 70% fibers 40 per unit of volume. In some embodiments, the fibers 40 may vary in size, length or circumference and may further be intentionally varied to provide a selected maximum fiber 40 density.

Figure 4:
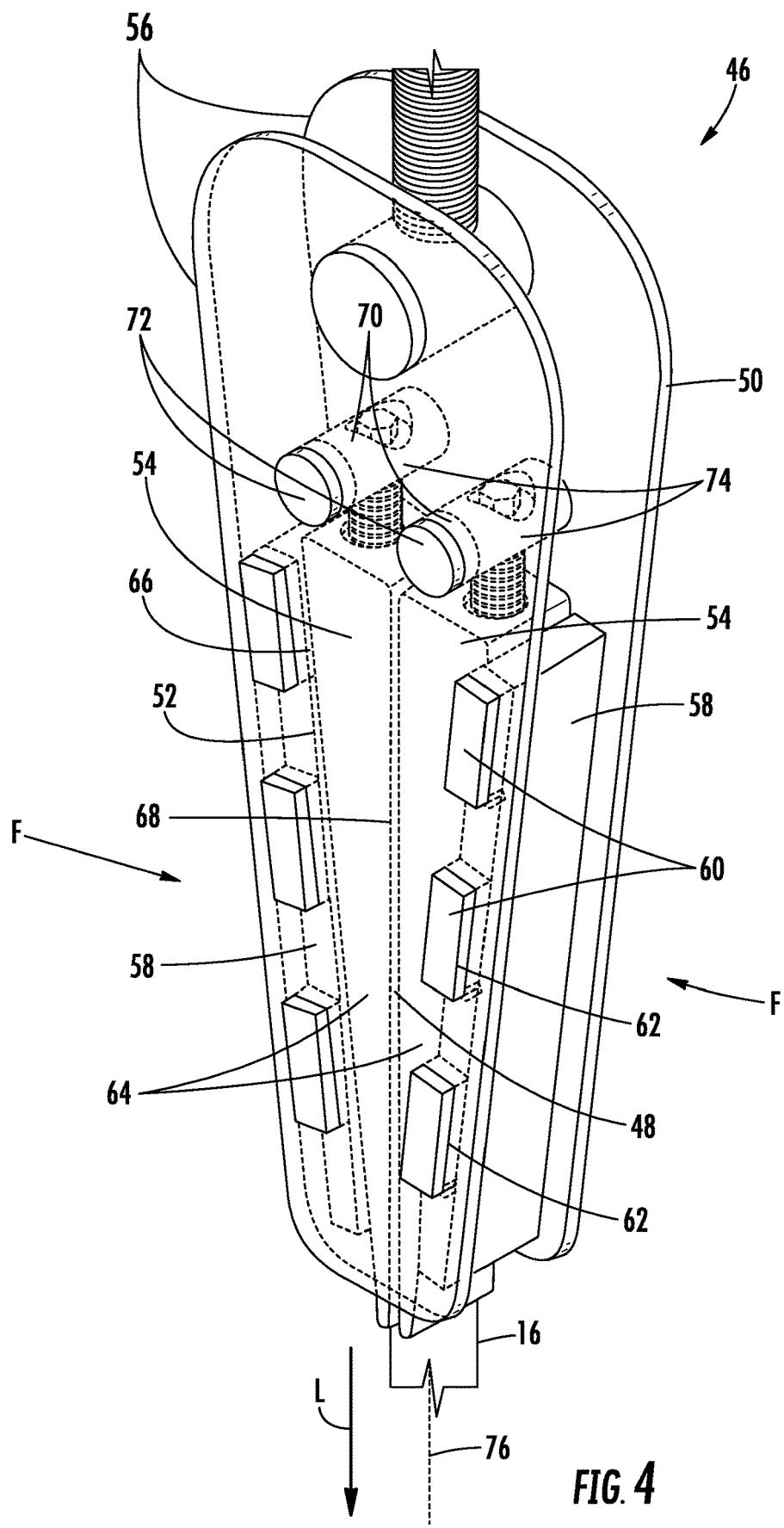
FIG. 4 illustrates a perspective view of a termination for a belt of an elevator system.

Referring now to FIG. 4, an embodiment of a termination 46 is illustrated. A belt end 48 of the belt 16 is installed and retained in the termination 46 at, for example, the elevator car 12 or the counterweight 22, as shown in FIG. 1. The termination 46 includes a housing 50, with a housing inner surface 52 tapering inwardly toward the belt 16 with increasing distance from the belt end 48. Two wedge assemblies 54 are installed in the housing 50 between the housing inner surface 52 and the belt 16.

Figure 5:
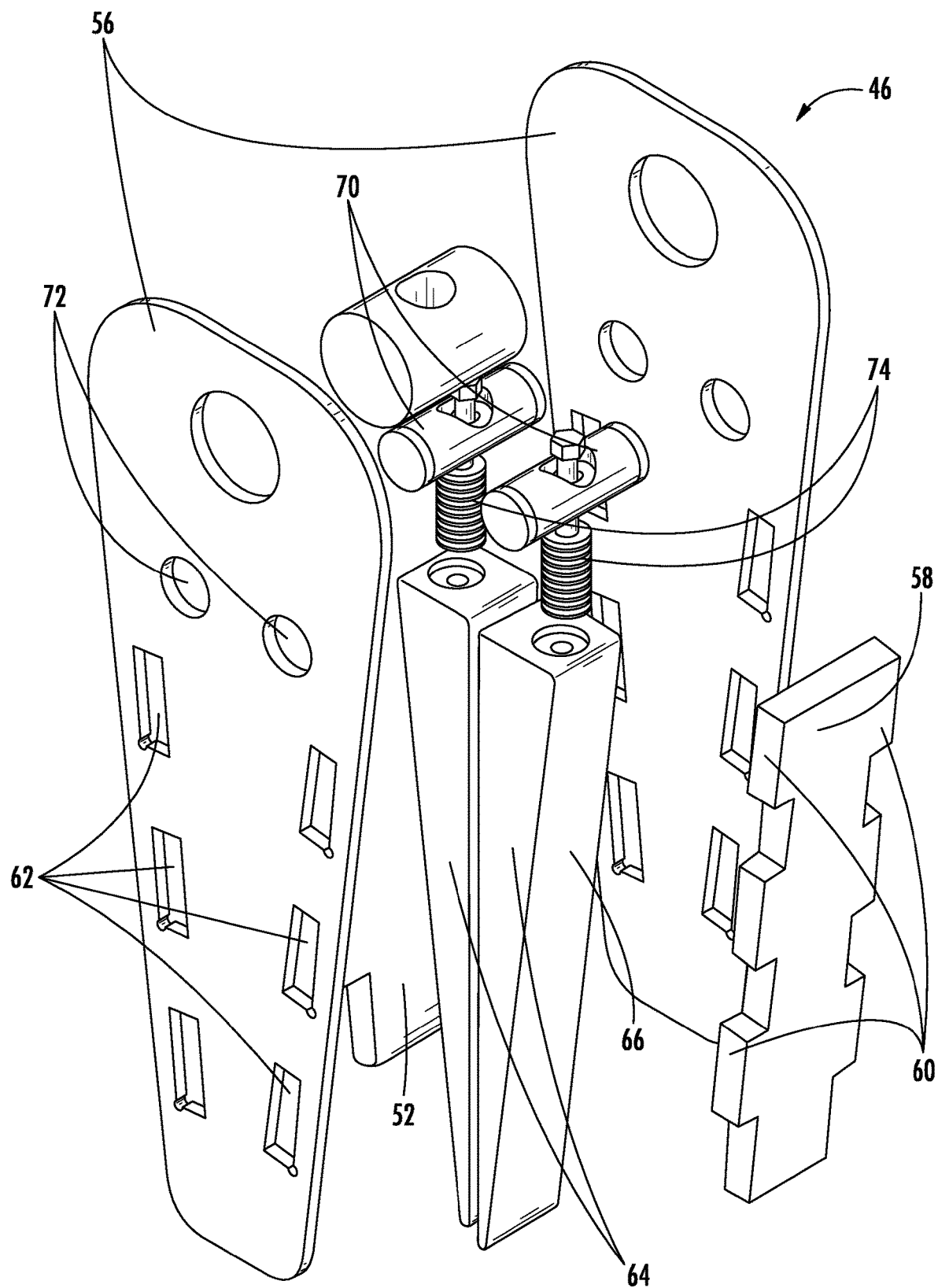
FIG. 5 is an exploded view of an embodiment of a termination.

Referring to the exploded view of FIG. 5, in some embodiments, the housing 50 includes two face plates 56 and two side plates 58 joined in welded assembly. Each of the side plates 58 defines a housing inner surface 52. In some embodiments, such as shown, each side plate 58 has a plurality of plate tabs 60, with each plate tab 60 insertable into a complimentary plate opening 62 in the face plate 56 to form the housing 50. While in the embodiment shown the housing 50 is formed from a welded plate assembly, one skilled in the art will appreciate that other housing 50 configurations may be utilized.

A first wedge assembly 54 is installed between the housing inner surface 52 and the traction surface 34 of the belt 16, with the wedge assembly 54 interactive with the traction surface 34. Additionally, a second wedge assembly 54 is installed between the housing inner surface 52 and the back surface 36 of the belt 16 and is interactive with the back surface 36. Edge wedge assembly 54 includes a wedge 64 including a wedge outer surface 66 abutting the housing inner surface 52 and having a taper complimentary with the housing inner surface 52. Further, each wedge 64 includes a wedge inner surface 68 abutting and interactive with the belt 16 when the belt end 48 is installed into the termination 46.

The wedge 64 is retained in the housing 50 via a rod and spring arrangement. A retaining rod 70 is fixed in the housing 50 by, for example, extending through a rod opening 72 in the face plate 56, and secured in place by, for example, welding or another retaining means. The retaining rod 70 is connected to a biasing element, such as a spring 74, which is also is connected to the wedge 64 and biases the wedge 64 in a direction along a belt axis 76 length away from the belt end 48 (downward in FIGS. 4 and 5).

To install the belt end 48 into the termination 46, the wedges 64 are urged along the belt axis 76 to overcome the bias of the springs 74, as result expanding a gap between the wedges 64 to allow for installation of the belt end 48 therebetween. The belt end 48 is then inserted between the wedges 64, and the wedges are released allowing the bias of the springs 74 to urge the wedges 64 along the housing inner surface 52 thus urging the wedges 64 toward the belt end 48.

When a load L is applied along the belt axis 76, the wedges 64 travel along the belt axis 76, and because of the taper of the housing inner surface 52 and the complimentary wedge outer surface 66, move inwardly toward the belt 16, thus applying a clamping force F to the belt 16 to retain the belt 16 at the termination 46. As the load L increases, the clamping force F similarly increases.

The termination disclosed herein allows for termination and restraint of an elevator belt end without bending or wrapping of the elevator belt end around a wedge, thus making it advantageous for use with belts having composite tension members. Further, the welded housing construction reduces the cost of fabrication relative to a typical termination assembly. Additionally, the inclusion of the biasing elements keeps the wedges and the belt end seated within the housing.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A termination device for a suspension member of an elevator system comprising:
   a termination housing; and
   two wedge assemblies disposed in the termination housing, the wedge assemblies interactive with a suspension member end disposed between the two wedge assemblies to apply a clamping force to the suspension member in response to an axial load acting on the suspension member end, each wedge assembly including:
      a wedge; and
      a biasing element operably connected to the wedge to bias a position of the wedge along a suspension member axis direction;
      wherein the biasing element is a spring operably connected to the wedge and to the termination housing; and
      wherein the spring extends between a retaining rod installed in the termination housing and the wedge.

2. The termination device of claim 1, wherein the termination housing includes a housing inner surface tapering inwardly toward the suspension member with increasing distance from the suspension member end.

3. The termination device of claim 2, wherein the wedge includes:
   a wedge outer surface abutting the housing inner surface and having a taper complimentary to the housing inner surface; and
   a wedge inner surface configured to abut the suspension member end.

4. The termination device of claim 2, wherein the termination housing comprises:
   two opposing face plates; and
   two opposing side plates affixed to the face plates, each side plate defining the housing inner surface.

5. The termination device of claim 4, further comprising:
   one or more plate tabs disposed in each side plate; and
   one or more plate openings disposed in each face plate, the one or more plate tabs insertable into the one or more plate openings to form the termination housing.

6. The termination device of claim 5, wherein the two face plates are secured to the two side plates via welding.

7. The termination device of claim 1, wherein the retaining rod extends through a face plate of the termination housing.

8. An elevator system comprising:
   a hoistway;
   an elevator car disposed in the hoistway;
   a suspension member operably connected to the elevator car to suspend and/or drive the elevator car along the hoistway; and
   a termination device disposed in the hoistway and operably connected to a suspension member end of the suspension member, the termination device including:
      a termination housing; and
      two wedge assemblies disposed in the termination housing, the wedge assemblies interactive with a suspension member end disposed between the two wedge assemblies to apply a clamping force to the suspension member in response to an axial load acting on the suspension member end, each wedge assembly including:
         a wedge; and
         a biasing element operably connected to the wedge to bias a position of the wedge along a suspension member axis direction;
         wherein the biasing element is a spring operably connected to the wedge and to the termination housing; and
         wherein the spring extends between a retaining rod installed in the termination housing and the wedge.

9. The elevator system of claim 8, wherein the termination housing includes a housing inner surface tapering inwardly toward the suspension member with increasing distance from the suspension member end.

10. The elevator system of claim 9, wherein the wedge includes:
    a wedge outer surface abutting the housing inner surface and having a taper complimentary to the housing inner surface; and
    a wedge inner surface configured to abut the suspension member end.

11. The elevator system of claim 9, wherein the termination housing comprises:
    two opposing face plates; and
    two opposing side plates affixed to the face plates, each side plate defining the housing inner surface.

12. The elevator system of claim 11, further comprising:
one or more plate tabs disposed in each side plate; and
one or more plate openings disposed in each face plate, the one or more plate tabs insertable into the one or more plate openings to form the termination housing.

13. The elevator system on claim 12, wherein the two face plates are secured to the two side plates via welding.

14. The elevator system on claim 8, wherein the retaining rod extends through a face plate of the housing.

15. The elevator system of claim 8, wherein the suspension member includes:
a plurality of tension elements extending along a length of the suspension member, each tension element including a plurality of fibers extending along the length of the suspension member bonded into a polymer matrix; and
a jacket substantially retaining the plurality of tension members.

16. The elevator system of claim 15, wherein the plurality of fibers are formed from one or more of carbon, glass, polyester, nylon, or aramid material.

* * * * *